United States Patent [19]
Williams

[11] Patent Number: 5,876,242
[45] Date of Patent: Mar. 2, 1999

[54] REMOTE BATTERY EXTENSION APPARATUS

[76] Inventor: Hugh D. Williams, 5 The Palisades, Williamsburg, Va. 23185-8611

[21] Appl. No.: 897,640

[22] Filed: Jul. 21, 1997

[51] Int. Cl.[6] ...................................................... H01R 3/00
[52] U.S. Cl. .............................................................. 439/500
[58] Field of Search .................................... 439/578, 500, 439/501, 502, 504, 518, 581, 391; 429/98

[56] References Cited

U.S. PATENT DOCUMENTS

| | | | |
|---|---|---|---|
| 4,075,402 | 2/1978 | Okamoto | 429/98 |
| 4,195,894 | 4/1980 | Kotski | 439/101 |
| 4,599,483 | 7/1986 | Kühn | 174/36 |
| 4,648,682 | 3/1987 | Tubbs | 439/391 |
| 5,575,682 | 11/1996 | Alexander | 439/500 |

FOREIGN PATENT DOCUMENTS 3522710A  1/1987  Germany .

*Primary Examiner*—Neil Abrams
*Assistant Examiner*—Barry M. L. Standig
*Attorney, Agent, or Firm*—MacMillan, Sobanski & Todd, LLC

[57] ABSTRACT

Extension apparatus for locating a battery remotely from an appliance, and accessibly. An extension cord has male and female terminals at each end. Each end has one female terminal and one male terminal. The terminals connected to the appliance are either snap fit terminals or coaxial terminals. At one end, the terminals correspond to those of the battery. At the other end, they manually connect to wiring terminals compatible with the battery terminals. The extension cord may terminate in a "dummy" battery, so that it occupies and is stably retained in the battery compartment of the appliance when connected to the appliance wiring. A battery enclosure stores a battery for powering the appliance and accepts penetration of the extension cord for internal connection to the battery. Terminals of the extension cord at the battery enclosure are snap fit terminals. The battery enclosure preferably has internal spool structure for winding and storing excess length of the extension cord. Optionally, the battery enclosure has a push-to-test momentary contact pushbutton.

17 Claims, 3 Drawing Sheets

REMOTE BATTERY EXTENSION APPARATUS

BACKGROUND OF THE INVENTION

1. Field of the Invention

The present invention relates to mounting of power cells or batteries remotely from an appliance powered by these cells or batteries. More particularly, the invention comprises apparatus enabling ready connection between a battery and its associated appliance. The apparatus includes an extension configured at both ends to cooperate with a battery cell, so that a conventional appliance and a battery cell may be readily connected.

2. Description of the Prior Art

Commercial, residential, and industrial buildings are frequently modified to offer functions related to safety, security and convenience. These functions may be those of convenience, providing illumination or information by appropriate lights. For example, emergency exits may be indicated by lights of characteristic, identifiable size, design, and color scheme. Clocks may be provided periodically throughout buildings for convenience of occupants. Safety and security devices may include, for example, detectors and annunciators of heat, motion, sound, products of combustion (hereinafter referred to as "smoke detectors"), carbon monoxide, specific chemical, and still others.

Increasingly, such devices are provided in forms independent of connection to the building electrical system. In many cases, they must be operable in the event of failure of electrical power, and thus are powered by batteries. This may be a matter of practicality enabling retrofitting to buildings wherein ready connection to the electrical system, is not feasible. In other cases, it is imperative that the device remain operable independently of the building electrical system Smoke detectors, for example, must be capable of operation even in the event of electrical failure. Security devices must remain operable despite attempts at disablement by intentional severance of electrical supply conductors or by similar actions.

Many protective detecting and annunciation devices must be located at the highest point of the spaces they monitor. Such locations may easily be beyond ready reach of occupants of the building. For example, in residences, high or so called "cathedral" ceilings may be present. In storage, service, and fabrication facilities, concert halls and other auditoriums, other high ceilings may be present.

When safety, security, and convenience appliances are mounted in somewhat inaccessible locations, there is a tendency to ignore requirements that the batteries be periodically monitored for power level and renewed as necessary. A great many house fires, many resulting in fatalities, have been allowed to propagate unnoticed due to ineffective smoke alarms. There remains a need for more accessible location of battery cells for such appliances, and for apparatus for testing the condition of the battery cells and their associated appliances.

One answer to this need is a suitable extension cord. Extension cords having unlike or dissimilar terminals at each end have been proposed in the prior art. U.S. Pat. No. 4,195,894, issued to Edward J. Kotski on Apr. 1, 1980, and 4,599,483, issued to Volker Khhn et al. on Jul. 8, 1986, and West German Patent Application Number 3,522,710, dated Jan. 8, 1987, all illustrate electrical extension cords having dissimilar terminals at each one end. Kotski and the German invention each illustrate a cord wherein each individual conductor has a first type of terminal at one end and an opposite or mating type of terminal at the other end, thereby enabling serial insertion into the circuit being extended. However, unlike these prior art devices, the present invention has a self-contained battery enclosure for mounting remotely from the appliance. The battery enclosure has a spool for storing excess cord length and, optionally, a press-to-test feature enabling remote testing of the appliance. In an additional option, the present invention includes an enlarged block supporting conductive terminals at one end, for physically replacing a battery in an appliance.

None of the above inventions and patents, taken either singly or in combination, is seen to describe the instant invention as claimed.

SUMMARY OF THE INVENTION

The present invention provides an extension cord and a remote battery enclosure for affording access to the battery of an appliance located out of easy reach. The enclosure is mounted at a convenient location. A power circuit extends to the appliance being served by the extension cord. The cord has terminals which are compatible with those of batteries at each end.

Each individual conductor has a male terminal at one end and a female terminal at the other, thereby enabling serial or "head-to-tail" insertion into the circuit being modified. These terminals may be snap connection terminals arranged abreast and fixed to a substantially rigid plate so that the assembly is readily pressed into engagement with or otherwise manually fitted to a battery or a corresponding wiring yoke, or they may be coaxial.

Optionally, one end includes enlarged support structure to which the terminals are mounted. This enlarged support structure mimics configuration and dimensions of a battery, so that it securely occupies a chamber formed in the appliance for holding a battery. The actual battery is relocated remotely at the battery enclosure. The enclosure has a removable, frictionally fit cover and spool structure within for storing excess length of the extension cord.

The extension is preferably twenty feet in length. This length enables horizontal extension of the cord from a central location on a ceiling to a vertical wall, and extension down the vertical wall to a suitable accessible location. Despite this length, if the distance spanned by the novel extension apparatus is sufficiently great, a second extension cord and battery enclosure may be employed. One battery enclosure serves as a junction box rather than containing a battery. The actual battery providing power to the appliance is contained within the more distant battery enclosure. Since building codes are moving in the direction of requiring independent smoke detectors in each bedroom, it may prove desirable to locate all batteries and press-to-test stations at one point, such as in a utility room, in a residence. This situation would obviously require more than one extension cord to connect the diverse appliances to the common location for the batteries.

If the installation is limited to the scheme described above, the extension cord includes two conductors. However, an optional press-to-test feature is available, for which the extension cord includes two additional conductors.

Accordingly, it is one object of the invention to connect a remotely located battery from an appliance served thereby.

It is another object of the invention that an extension cord connecting a battery to its served appliance be serially insertable between the battery and the connection wiring of the appliance.

It is a further object of the invention to provide structure in the extension cord for occupying space located within the appliance for containing a battery, so that the terminals of the extension cord connected to the wiring of the appliance are stably secured within the appliance.

Still another object of the invention is to enable remote testing of the appliance.

An additional object of the invention is to store excess length of the extension cord within the battery enclosure.

It is again an object of the invention to provide an extension cord capable of spanning significant lengths of the dimensions of a room within a building.

Yet another object of the invention is to enable ready connection of an extension cord to snap fit terminals and to coaxial terminals of the appliance.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
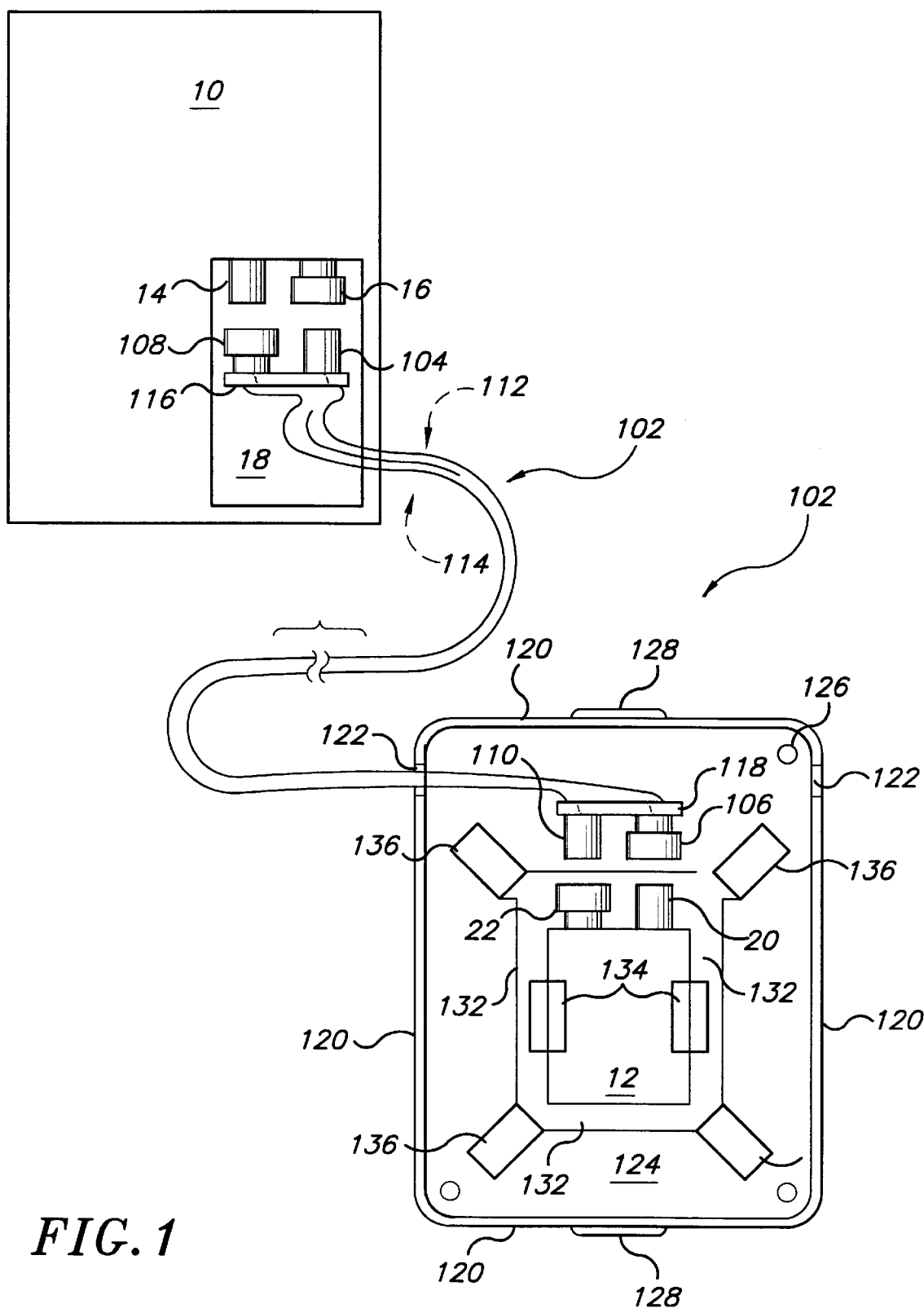
FIG. 1 is an exploded, environmental, diagrammatic, top plan view of one embodiment of the invention.

FIG. 1 of the drawings shows a battery powered appliance 10 and a remotely located battery 12 mounted in a battery enclosure 100 and connected to appliance 10 by an extension cord 102. Extension cord 102 is greater than six feet (2 meters) in length, and is preferably twenty feet (6 meters) in length. Appliance 10 has male and female terminals 14, 16 disposed within a battery compartment 18. Appliance 10 represents any conventional battery powered device, such as a smoke detector. Normally, battery 12 is contained within compartment 18. Terminals 14, 16 may be rigidly fixed to appliance 10, or may be fixed to flexible conductors (not shown) with or without a substantially rigid plate (not shown) maintaining terminals 14, 16 in parallel, spaced apart relation.

According to the present invention, battery 12 is remotely located from appliance 10 for purposes of ready access. Battery 12 has male and female terminals 20, 22 which normally may be aligned and pressed into engagement with terminals 14, 16. However, to enable ready connection to appliance 10 and battery 12 in the same manner in which these components would conventionally engage one another, extension cord 102 is provided with terminals 104, 106, 108, 110 according to the following scheme.

Extension cord 102 has a first conductor 112 and a second conductor 114 each having a conventional insulation jacket for preventing short circuits and ground faults. Terminal 104, which is a male snap terminal, is disposed at the proximal end of first conductor 112. Terminal 106, which is a female snap terminal, is disposed at the distal end of conductor 112.

A male snap terminal is a terminal formed from metal and is configured as an open or closed cylinder. A slight externally projecting circumferential bulge is formed at the end of the cylinder away from the battery or other device to which the terminal is attached. This bulge resiliently engages a female socket formed in a mating terminal of a device being connected to the male snap terminal. A female snap terminal is a terminal formed from metal and comprises a series of resilient fingers arranged in radial symmetry about an axis. The fingers thus form a resiliently deformable socket which closes over and grasps a male snap terminal. In conventional practice in commercially available battery cells, male and female snap terminals are dimensioned and configured so that the male fits into the female to provide a secure but manually removable fit.

Terminal 108 is a female snap terminal disposed at the proximal end of conductor 112.

Conductor 112 is terminated at its distal end by male snap terminal 110. Preferably, terminals 104 and 108 are mounted to a substantially rigid plate 116. Plate 116 is sufficiently rigid so as to hold terminals 104 and 108 in parallel, spaced apart relationship when plate 116 is grasped and terminals 104, 108 are pressed into engagement with terminals 14, 16 of appliance 10. Of course, a slight degree of deformability under manual pressure is acceptable, as long as terminals 104, 108 are maintained in alignment with terminals 14, 16 when mating. Similarly, terminals 106, 110 are mounted on a substantially rigid plate 118. Thus it will be seen that extension cord 102 is readily insertable serially between appliance 10 and battery 12, while enabling manual, removable connection of cord 102 to appliance 10 and battery 12.

Battery enclosure 100 has lateral walls 120 relieved by one or more slots 122 for admitting passage of extension cord 102 thereinto. Battery enclosure may have a floor 124 bearing holes 126 for accepting screws (not shown) or other fasteners for mounting battery enclosure to an environmental surface (not shown). Two opposed walls 120 have short projections 128 which play a role in releasably retaining a cover 130 (see FIG. 2) closing battery enclosure 100.

Internal walls 132 and resilient clips 134 surroundingly retaining battery cell 12 within battery enclosure 100. Sufficient space is provided within battery enclosure 1 00 such that battery cell 12 may be stored therein and simultaneously connected to terminals 106, 110 of extension cord 102.

Fingers 136 project from walls 132 such that they open away from one another, thereby forming spool structure which may be employed for windingly storing excess length of extension cord 102 within battery enclosure 100. Of course, the spool structure may be formed separately and apart from walls 132.

Figure 2:
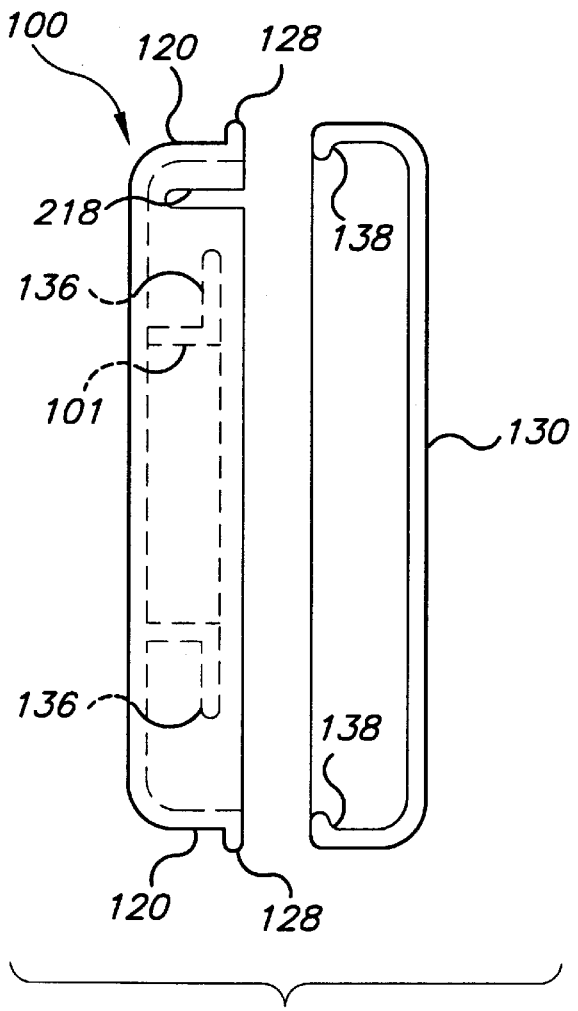
FIG. 2 is an exploded, side elevational view of a component seen at the lower right of FIG. 1 and a cover therefor.

Spool structure, slot 122, cover 130, and engagement of cover 130 by battery enclosure 100 are clearly seen ha FIG. 2. Cover 130 is seen to have projections 138 which cooperate with projections 128 to latch cover 130 to walls 120. Battery enclosure 100 or cover 130 or both are slightly elastic, so that cover 130 yieldingly deforms to engage enclosure 100 as it is manually installed on and removed from enclosure 100. This feature enables the stationary component of battery enclosure 100, that being the component including lateral walls 120 to remain undisturbed when battery 12 is being renewed. Apart from being temporarily pulled free of battery 12, extension cord 102 also is essentially undisturbed, and need not be removed from mounting on wall and ceiling surfaces (not shown). FIG. 2 also reveals a battery chamber 101 defined in the center of battery enclosure 100.

Figure 3:
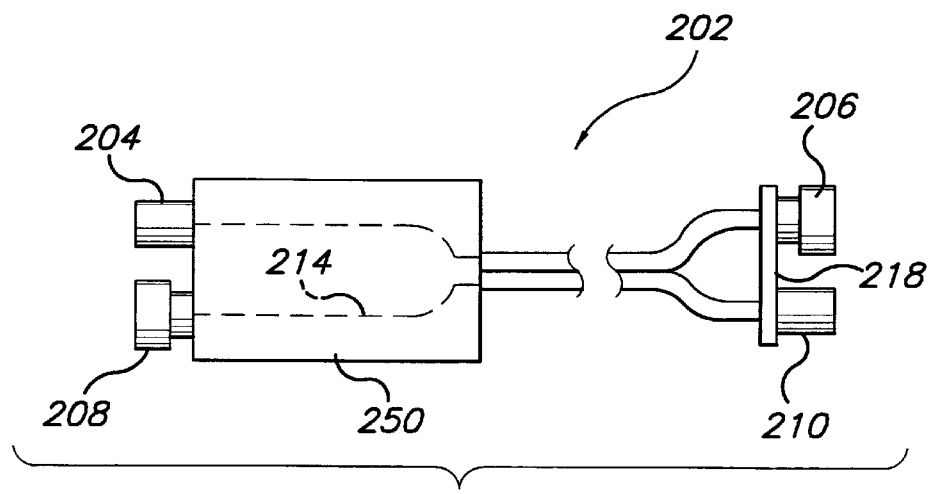
FIG. 3 is a top plan view of an alternative embodiment of an extension cord according to the present invention.

Turning now to FIG. 3, in an alternative embodiment intended for use with an appliance 10 having a close fitting battery compartment 18, extension cord 202 is modified at its distal end to exploit compartment 18. An anchorage member 250 serves as a member for supporting male snap terminal 204 and female snap terminal 208. Terminals 204, 208 are connected respectively to terminals 206, 210 at the distal end of cord 202 by conductors 212, 214 (respectively). Terminals 206, 210 are preferably mounted on a rigid plate 218 in the manner of the embodiment of FIG. 1. Member 250 occupies battery compartment 18 or equivalent battery holding structure formed in the appliance, thereby stably securing snap terminals 204, 208 within appliance 10.

Figure 4:
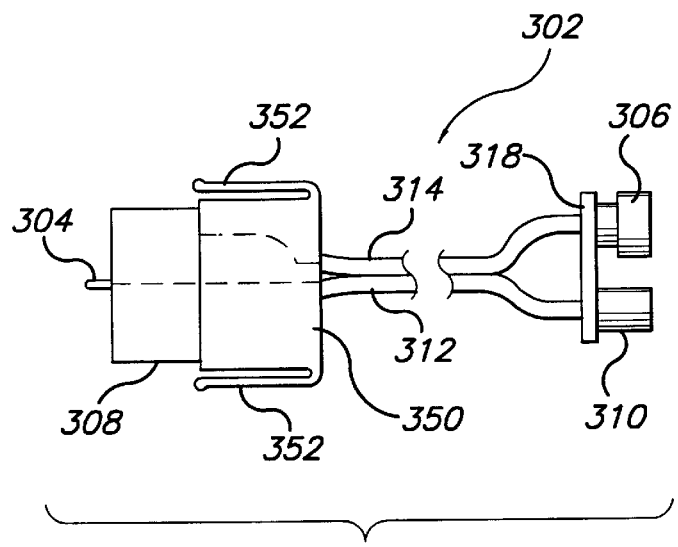
FIG. 4 is a top plan view of a further alternative embodiment of an extension cord according to the present invention.

FIG. 4 illustrates an alternative embodiment of the extension cord wherein connection may be made to an appliance (not shown) fitted with a coaxial connector. At its distal end, extension cord 302 essentially repeats construction of the embodiment of FIG. 1, having a female snap terminal 306 and a male snap terminal 310 mounted on a substantially rigid plate 318.

However, at the proximal end, cord 302 has a coaxial connector including a male terminal 304 disposed concentrically within a female terminal 308. A connection member 350 Supports terminals 304, 308, and preferably includes resilient clip arms 352 which may be pinched to constrict such that the coaxial connector is removably mounted in a hole formed in a thin wall (not shown) of the appliance (not shown) served by cord 302. Terminals 304, 308 are electrically connected to their associated terminals 306, 310 by insulated conductors 312, 314 (respectively).

Figure 5:
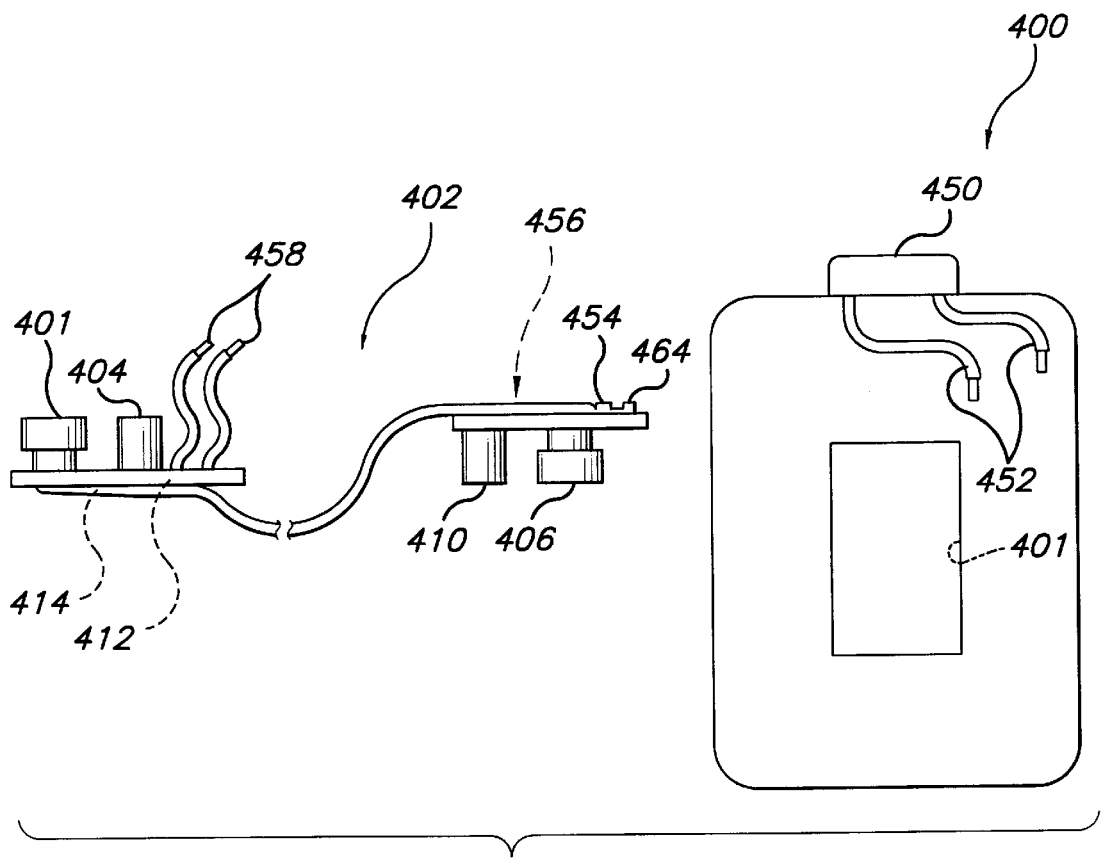
FIG. 5 is an exploded, diagrammatic, top plan view similar to FIG. 1, but showing an optional press-to-test feature.

Referring now to FIG. 5, some appliances (not shown) may be provided with a press-to-test feature which may be remotely activated utilizing a further embodiment of the invention. A momentary contact pushbutton 450 is mounted accessibly on the exterior of battery enclosure 400. Two conductors 452 project from switching terminals (not separately shown) of pushbutton 450 to the interior of enclosure 400, thereby enabling pushbutton 450 to be connected to extension cord 402.

Extension cord 402 has a female snap terminal 406 and a male snap terminal 410 located at its distal end, as well as terminals 454 of any suitable type for engaging conductors 452 extending from the switching contacts (not separately shown) of pushbutton 450. Conductors 452 are flexible and sufficiently long to enable connection to terminals 454 even when battery chamber 401, which is essentially similar to chamber 101 of FIG. 2, is occupied by a battery cell (not shown).

At its proximal end, cord 402 has male and female snap terminals 404, 408, which are respectively connected to terminals 406, 410 by insulated conductors 412, 414. However, cord 402 has third and fourth conductors 456 connecting terminals 454 to the proximal end of cord 402. At the proximal end, conductors 456 terminate in flexible pigtails 458 for connection to the press-to-test circuitry (not shown) of the appliance. For appliances designed to accept extension cord 402 by provision of suitable accessible wiring terminals (not shown), cord 402 may be modified to have compatible terminals (not shown) at the free ends of pigtails 458. When pigtails 458 are connected to the press-to-test circuitry of the served appliance, this circuitry may be remotely tested by pressing pushbutton 450.

The present invention is susceptible to variations and modifications which may be introduced without departing from the inventive concept. For example, any of the described features may be combined with others even though the combination is not explicitly set forth herein. Further examples are cited below.

Conductors of the extension cord, such as conductors 212, 214 of the embodiment of FIG. 3, may be joined together or may be separate. These conductors may comprise flattened conductive strips in the manner of so-called flat cable, so that the extension cord may pass between the body and cover of the appliance or even of the battery enclosure, if desired.

There is no requirement that the extension cord be entrapped within or otherwise secured to the battery enclosure, and may thus be manually disengageable from the battery enclosure.

The extension cord must be able to be connected to the battery inside the battery enclosure, and to extend to the appliance. The extension cord may be concealed within building walls and ceilings, or surface mounted to walls and ceilings, with or without a covering raceway (not shown).

The foregoing discussion has generally been directed to smoke detectors. However, it must be realized that any type of battery operated appliance, including indicating and small illumination lights, clocks, signs, detectors and annunciators of heat, motion, sound, carbon monoxide and other chemicals, and still others, may enjoy the benefits of the present invention.

It is to be understood that the present invention is not limited to the embodiments described above, but encompasses any and all embodiments within the scope of the following claims.

I claim:

1. Battery extension apparatus for connecting an appliance to a battery remotely located from the appliance, said battery extension apparatus comprising an extension cord readily insertable serially between the appliance and the battery, said extension cord comprising:

a first conductor having an insulation jacket, a proximal end, a distal end, a first male snap terminal disposed at said proximal end of said first conductor, and a first female snap terminal disposed at said distal end of said first conductor; and a second conductor having an insulation jacket, a proximal end, a distal end, a second male snap terminal disposed at said distal end of said second conductor, and a second female snap terminal disposed at said proximal end of said second conductor, said first conductor and said second conductor each exceeding six feet in length.

2. The battery extension apparatus according to claim 1, said first conductor further comprising a substantially rigid first plate connected thereto at said proximal end of said first conductor and said second conductor, said first male snap terminal and said second female snap terminal mounted on said first plate and arranged in parallel, spaced apart relation to one another.

3. The battery extension apparatus according to claim 2, said first conductor further comprising a substantially rigid second plate connected thereto at said distal end of said first conductor and said second conductor, said second male snap terminal and said first female snap terminal mounted on said second plate and arranged in parallel, spaced apart relation to one another.

4. The battery extension apparatus according to claim 1, said extension cord further comprising an anchorage member forming a parallelepiped disposed at said proximal end of said first conductor and at said proximal end of said second conductor, said first rigid plate joined to said anchorage member, whereby said anchorage member occupies battery holding structure formed in the appliance, thereby stably securing said first male snap terminal and said first female snap terminal within the appliance.

5. The battery extension apparatus according to claim 1, further comprising a battery enclosure having lateral walls, a cover, an opening for admitting passage of said extension cord into said battery enclosure, and structure for surroundingly retaining a battery cell within said battery enclosure, whereby a battery cell may be stored within said battery enclosure and simultaneously connected to said extension cord.

6. The battery extension apparatus according to claim 5, said battery enclosure further comprising spool structure disposed within and fixed to said battery enclosure, for windingly storing excess length of said extension cord within said battery enclosure.

7. The battery extension apparatus according to claim 5, said battery enclosure further comprising a momentary contact pushbutton accessible from the exterior of said battery enclosure, and said extension cord further comprising a third conductor having an insulation jacket, a proximal end, and a distal end, and a fourth conductor having an insulation jacket, a proximal end, and a distal end, said distal end of said third conductor and said distal end of said fourth conductor operably connected to said momentary contact pushbutton, whereby remote testing of the appliance is enabled when said proximal end of said third conductor and said proximal end of said fourth conductor are connected into a testing circuit of the appliance.

8. The battery extension apparatus according to claim 5, said battery enclosure and said cover further including attachment structure for manually and removably attaching said cover to said battery enclosure, whereby said extension cord and said lateral walls of said battery enclosure may remain undisturbed when the battery is being renewed.

9. Battery extension apparatus for connecting an appliance to a battery remotely located from the appliance, said battery extension apparatus comprising an extension cord readily insertable serially between the appliance and the battery, said extension cord comprising:

a first conductor having an insulation jacket, a proximal end, a distal end, a male coaxial terminal disposed at said proximal end of said first conductor, and a female snap terminal disposed at said distal end of said first conductor: and a second conductor having an insulation jacket, a proximal end, a distal end, a male snap terminal disposed at said distal end of said second conductor, and a female coaxial terminal disposed at said proximal end of said second conductor coaxially with respect to said male coaxial terminal, said first conductor and said second conductor each exceeding six feet in length.

10. The battery extension apparatus according to claim 9, further comprising a battery enclosure having lateral walls, a cover, an opening for admitting passage of said extension cord into said battery enclosure, and structure for surroundingly retaining a battery cell within said battery enclosure, whereby a battery cell may be stored within said battery enclosure and simultaneously connected to said extension cord.

11. The battery extension apparatus according to claim 9, said battery enclosure further comprising spool structure disposed within and fixed to said battery enclosure, for windingly storing excess length of said extension cord within said battery enclosure.

12. The battery extension apparatus according to claim 9, said battery enclosure further comprising a momentary contact pushbutton accessible from the exterior of said battery enclosure, and said extension cord further comprising a third conductor having an insulation jacket, a proximal end, and a distal end, and a fourth conductor having an insulation jacket, a proximal end, and a distal end, said distal end of said third conductor and said distal end of said fourth conductor operably connected to said momentary contact pushbutton, whereby remote testing of the appliance is enabled when said proximal end of said third conductor and said proximal end of said fourth conductor are connected into a testing circuit of the appliance.

13. The battery extension apparatus according to claim 9, said battery enclosure and said cover further including attachment structure for manually and removably attaching said cover to said battery enclosure, whereby said extension cord and said lateral walls of said battery enclosure may remain undisturbed when the battery is being renewed.

14. Battery extension apparatus for connecting an appliance to a battery remotely located from the appliance, said battery extension apparatus comprising an extension cord readily insertable serially between the appliance and the battery, having a first conductor having an insulation jacket, a proximal end, a distal end, a first male terminal disposed at said proximal end of said first conductor, and a first female terminal disposed at said distal end of said first conductor, and a second conductor having an insulation jacket, a proximal end, a distal end, a second male terminal disposed at said distal end of said second conductor, and a second female terminal disposed at said proximal end of said second conductor, said first conductor and said second conductor each exceeding six feet in length; and a battery enclosure having lateral walls, a cover, an opening for admitting passage of said extension cord into said battery enclosure, and structure for surroundingly retaining a battery cell within said battery enclosure, whereby a battery cell may be stored within said battery enclosure and simultaneously connected to said extension cord.

15. The battery extension apparatus according to claim 14, said battery enclosure further comprising spool structure disposed within and fixed to said battery enclosure, for windingly storing excess length of said extension cord within said battery enclosure.

16. Thle battery extension apparatus according to claim 14, said battery enclosure further comprising a momentary contact pushbutton accessible from the exterior of said battery enclosure, and said extension cord further comprising a third conductor having an insulation jacket, a proximal end, and a distal end, and a fourth conductor having an insulation jacket, a proximal end, and a distal end, said distal end of said third conductor and said distal end of said fourth conductor operably connected to said momentary contact pushbutton, whereby remote testing of the appliance is enabled when said proximal end of said third conductor and said proximal end of said fourth conductor are connected into a testing circuit of the appliance.

17. The battery extension apparatus according to claim 14, said battery enclosure and said cover further including attachment structure for manually and removably attaching said cover to said battery enclosure, whereby said extension cord and said lateral walls of said battery enclosure may remain undisturbed when the battery is being renewed.

* * * * *